United States Patent
Mori et al.

(10) Patent No.: US 6,943,421 B2
(45) Date of Patent: Sep. 13, 2005

(54) OPTICAL ELEMENT MOUNTED BODY AND OPTICAL SEMICONDUCTOR MODULE USING THE SAME

(75) Inventors: Hajime Mori, Tokyo (JP); Masayuki Iwase, Tokyo (JP)

(73) Assignee: The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/618,735

(22) Filed: Jul. 15, 2003

(65) Prior Publication Data

US 2004/0016933 A1 Jan. 29, 2004

(30) Foreign Application Priority Data

Jul. 24, 2002 (JP) ........................................ 2002-215222

(51) Int. Cl.⁷ ................. H01L 31/0203; H01L 31/0232; H01L 27/14
(52) U.S. Cl. ..................... 257/432; 257/431; 257/433
(58) Field of Search ................................ 257/432, 431, 257/433; 385/83, 76

(56) References Cited

U.S. PATENT DOCUMENTS

| 4,891,816 A | * | 1/1990 | Yoshida et al. ............... 372/50 |
| 5,715,267 A | | 2/1998 | Iwase |
| 6,181,854 B1 | * | 1/2001 | Kojima et al. ................ 385/49 |
| 6,257,772 B1 | | 7/2001 | Nakanishi et al. |
| 6,270,263 B1 | | 8/2001 | Iwase et al. |
| 6,309,113 B1 | * | 10/2001 | Naito .......................... 385/88 |

* cited by examiner

*Primary Examiner*—Nitin Parekh
(74) *Attorney, Agent, or Firm*—Oblon, Spivak, McClelland, Maier & Neustadt, P.C.

(57) ABSTRACT

An optical element mounted body is disclosed. The optical element mounted body comprising: an optical semiconductor element having a light-emitting/light-receiving portion and a predetermined structure formed on a primary surface thereof; and a substrate having a mounting surface; wherein said substrate has a first hollow formed on said mounting surface, and wherein said optical semiconductor element is mounted junction-down on said substrate such that said structure of said optical semiconductor element and said first hollow of said substrate face each other.

16 Claims, 7 Drawing Sheets

OPTICAL ELEMENT MOUNTED BODY AND OPTICAL SEMICONDUCTOR MODULE USING THE SAME

BACKGROUND OF THE INVENTION

1. Field of the Invention

The present invention relates to an optical element mounted body, and an optical semiconductor module using the optical element mounted body.

2. Related Art

Optical semiconductor elements of various kinds are used in optical modules in which an optical component, such as an optical fiber or an optical waveguide, is optically coupled to a light-emitting end face or a light-receiving end face of the optical semiconductor element. In the optical modules, the optical axis of the optical semiconductor element and that of the optical component have to be aligned each other.

In particular, in the case of optically coupling an optical fiber to an optical semiconductor element such as a semiconductor laser element (LD) or a waveguide-type photodiode (WG-PD), the alignment precision must be controlled within +/−1 µm or so.

In the related art, the alignment has been exemplarily done in a manner as follows: facing an end face of an optical fiber to a light-emitting end face of an LD when driving the LD, monitoring the output light coupled to the optical fiber while searching for a fiber position to attain a maximum light output, until fixing their positions.

The alignment of the above method, however, necessitates a very complicated work to be done, and is not suitable in pursuing cost cutting and mass production of optical modules.

It is for that reason that recently, a method so-called passive alignment is being developed for practical use. In the passive alignment technique, the relative position between an optical semiconductor element and an optical element mounting substrate (hereinafter referred to simply as 'mounting substrate'), and the relative position between the mounting substrate and an optical component as well, are precisely determined, whereby the optical semiconductor element and the optical component can be aligned through the mounting substrate and optically coupled each other, thus eliminating the need to drive the optical semiconductor element while the alignment.

To be more concrete, in the technique, alignment markers are provided precisely on both the optical semiconductor element and the mounting substrate, which will be used when mounting the optical semiconductor element on the mounting substrate to determine the relative position of the optical semiconductor element and the mounting substrate such that the alignment marker on one is at a predetermined position relative to the alignment marker on the other.

The optical semiconductor element having an alignment marker is known in U.S. Pat. No. 5,715,267, the entire content of which is incorporated herein by reference. FIG. 7 shows a semiconductor laser element disclosed in the U.S. Pat. No. 5,715,267, in which two stripes of mesa are formed in parallel to each other on a substrate 5e with a predetermined distance interposed therebetween in the widthwise direction of the substrate 5e, one of the mesa stripes including an active layer 5c emitting a laser beam while the other having a V-groove marker 5b formed on top of it. Since these mesa stripes are formed simultaneously in one etching process in the course of manufacturing the semiconductor laser element 5, the relative position of the two mesa stripes are precisely fixed, and the separation between the V-groove marker 5b and the active layer 5c as well. The V-groove marker 5b are formed by leaving a dielectric layer on the top of one mesa stripe, which restrains the crystal growth of semiconductor layers thereon when burying the other mesa stripe with the semiconductor material.

In general, optical semiconductor elements are mounted junction-down on mounting substrates, in which the top surface (i.e. the surface formed through crystal growth, or the upper surface 5a in FIG. 7) is faced to the mounting substrate.

This is because the top surface of the optical semiconductor element, which was formed through vapor phase epitaxial growth technique, is superior in the preciseness of thickness of each semiconductor layer, typically being controlled within +/−0.1 µm or so, to the bottom surface which generally has a roughness in the range of +/−10 µm or so even after a polishing process. Hence, the top surface is more suitable than the bottom surface to be used as a reference plane above which the height of the active layer, or a light-emitting/light-receiving portion of the optical semiconductor element, is determined, helping to ensure the alignment precision in the direction perpendicular to a mounting surface of the mounting substrate.

The mounting substrate having an alignment marker is known in U.S. Pat. No. 6,270,263, the entire content of which is incorporated herein by reference. FIG. 9 is a sectional view of the optical module disclosed in U.S. Pat. No. 6,270,263. In the optical module, the mounting substrate 4' is formed of silicon for example, and has a predetermined wiring patterns and V-grooves formed in parallel to the direction in which optical signals are inputted or outputted through an optical fiber 3, on the surface on which an semiconductor laser element 5 is disposed. The V-grooves on the mounting substrate 4' serve as alignment markers when mounting the above-described semiconductor laser element 5 having an alignment marker on the mounting substrate 4'.

Using such mounting substrate 4', the position of the optical fiber 3 relative to the mounting substrate 4' is determined by engaging the V-grooves on the mounting substrate 4' with the ridges 2a3 formed precisely on the package 2 with a predetermined positional relation to the longitudinal hole 2a1 holding the optical fiber 3.

Thus, the optical fiber 3 held in the longitudinal hole 2a1 of the package 2 and the semiconductor laser element 5 fixedly positioned on the mounting substrate 4' using the alignment markers are precisely aligned and optically coupled to each other.

In some cases, the semiconductor laser element 5 as shown in FIG. 7 may have a projection 5d of irregular height generated in the vicinity of and along the V-groove marker 5b (i.e. in the region marked IV in FIG. 7), as shown in FIG. 8. Such projections 5d may be irregularly generated on account of an abnormal crystal growth of semiconductor occurred in the region in a manufacturing process of the semiconductor laser element 5.

In another case, the semiconductor laser element 5 may have a projection 5d of irregular height generated on the edge portion of the upper electrode 5k (i.e. in the region marked V in FIG. 7), as shown in FIG. 10. Such projections 5d may be irregularly generated in an electrode forming process of the semiconductor laser element 5.

When mounting such a semiconductor laser element 5 junction-down on a mounting substrate, the projection 5d can be a cause of gap between the surface of the semiconductor laser element 5 and the mounting surface of the mounting substrate 4'.

Furthermore, in the case where a semiconductor laser element 5' as shown in FIG. 11(A) is aligned with respect to the mounting substrate by employing an edge of the electrode 5k on upper surface as an alignment marker instead of the V-groove 5b of FIG. 7, an irregular projection on the edge portion of the electrode 5k, that may sometimes appear in the region marked VI in FIG. 11(A) as shown in FIG. 11(B)), could be a cause of gap between the surface of the semiconductor laser element 5' and the mounting surface of the mounting substrate 4'.

In some cases, such a gap could impede a dissipation of heat generated at the semiconductor laser element to the mounting substrate, deteriorating the performance of the semiconductor laser element.

In another case, such a gap could be a cause of the position of the semiconductor laser element relative to the mounting substrate being different from element to element, causing thereby an aligned position of the optical fiber relative to the semiconductor laser element being different from element to element. Thus, the optical coupling efficiency between the semiconductor laser element and the optical fiber could be different from element to element.

In still another case, such a gap could be a cause of insufficient fixing strength of the semiconductor laser element to the mounting substrate, accounting for the semiconductor laser element being coming off the mounting substrate 4' when wire-bonding the semiconductor laser element to an external circuit.

SUMMARY OF THE INVENTION

In general, in one aspect, the present invention relates to an optical element mounted body. The optical element mounted body comprises an optical semiconductor element having a light-emitting/light-receiving portion and a predetermined structure formed on a primary surface thereof; and a substrate having a mounting surface formed with a first hollow; wherein the optical semiconductor element is mounted junction-down on the substrate such that the structure of the optical semiconductor element and the first hollow of the substrate face each other.

In general, in one aspect, the present invention relates to an optical module. The optical module comprises an optical semiconductor element having a light-emitting/light-receiving portion and a predetermined structure formed on a primary surface thereof; a substrate having a mounting surface; an optical component optically coupled to the optical semiconductor element; and a package housing the optical semiconductor element and the substrate; wherein the substrate has a first hollow formed on the mounting surface, and wherein the optical semiconductor element is mounted junction-down on the substrate such that the structure of the optical semiconductor element and the first hollow of the substrate face each other.

Other aspects and advantages of the invention will be apparent from the following description and appended claims.

DETAILED DESCRIPTION

Figure 1:
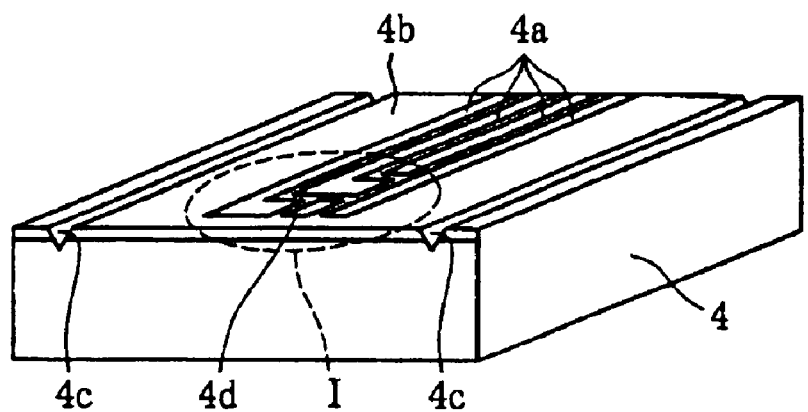
FIG. 1 is a perspective view showing a mounting substrate used in an optical element mounted body according to one embodiment of the present invention.

Referring now to the drawings, the embodiment of the present invention will be explained in detail as follows.

Figure 7:
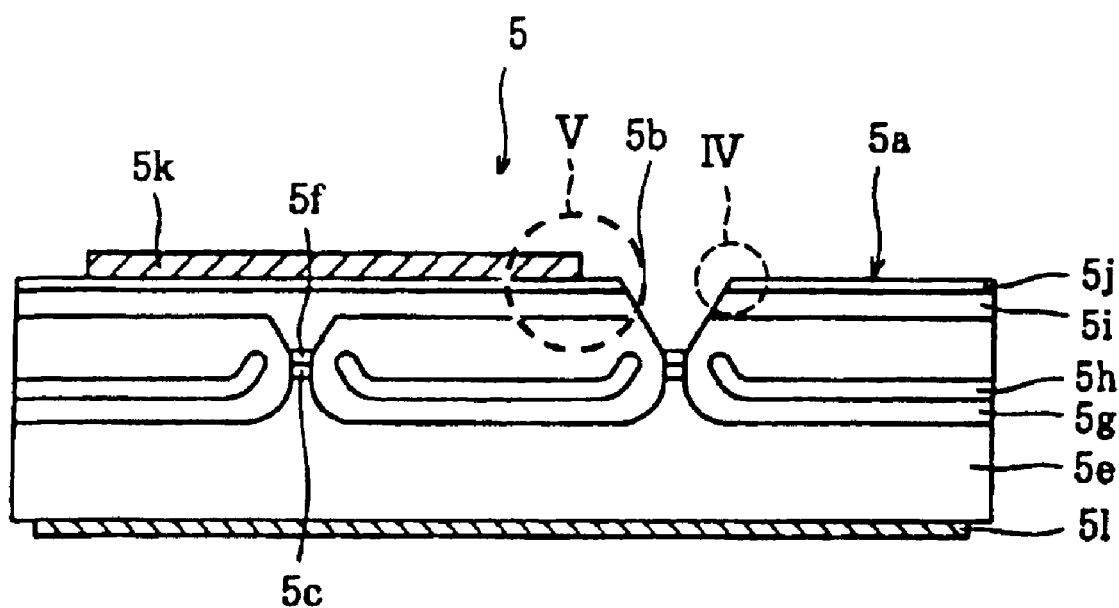
FIG. 7 is a sectional view of a semiconductor laser element disclosed in U.S. Pat. No. 5,715,267.
Figure 8:
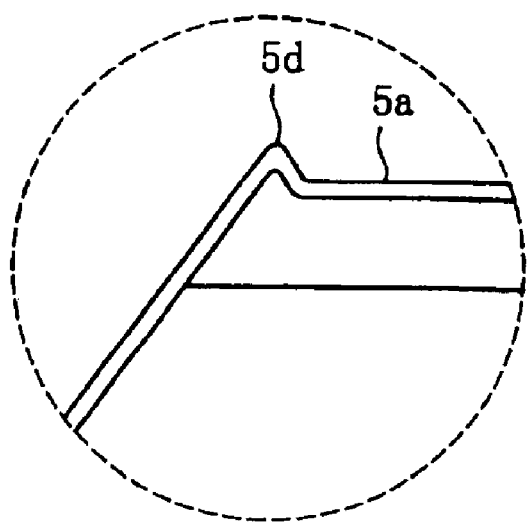
FIG. 8 is an expanded view of the region IV in FIG. 7, schematically showing a projection that may be generated by an abnormal crystal growth of semiconductor.
Figure 9:
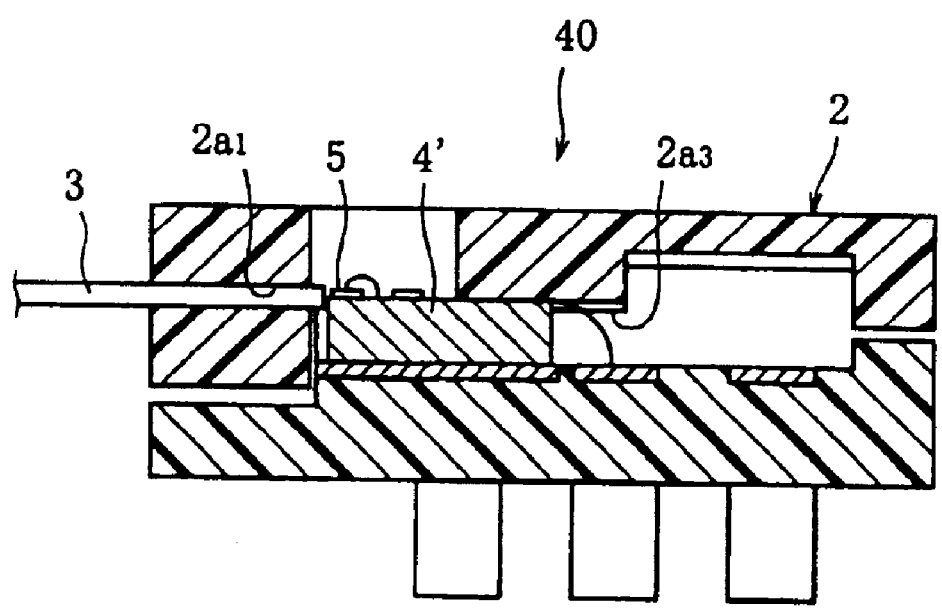
FIG. 9 is a sectional view of the optical module disclosed in U.S. Pat. No. 6,270,263.

FIG. 1 is a perspective view showing a mounting substrate used in an optical element mounted body according to one embodiment of the present invention. An optical semiconductor element, or a semiconductor laser element (LD) 5 to be mounted on the mounting substrate 4, has a structure as shown in FIG. 7, in which a V-groove marker 5b, serving as an alignment marker, is formed on a upper surface (primary surface) 5a with a predetermined distance separated from an active layer 5c in the widthwise direction of the semiconductor laser element 5. In the vicinity of the V-groove 5b, a projection 5d is present whose spread and height are irregular along the longitudinal direction of the V-groove 5b, as shown in FIG. 8. The projection 5d may typically be generated by an abnormal crystal growth of semiconductor in a manufacturing process of the LD 5.

As shown in FIG. 1, two V-grooves 4c are formed in parallel to each other along an optical axis on a mounting surface 4b of the mounting substrate 4. On the region between the two V-grooves 4c on the mounting surface 4b, a predetermined wiring patterns 4a are formed for supplying electric powers to the LD 5 and a photodiode (PD) to be mounted on the mounting surface 4b.

Figure 2:
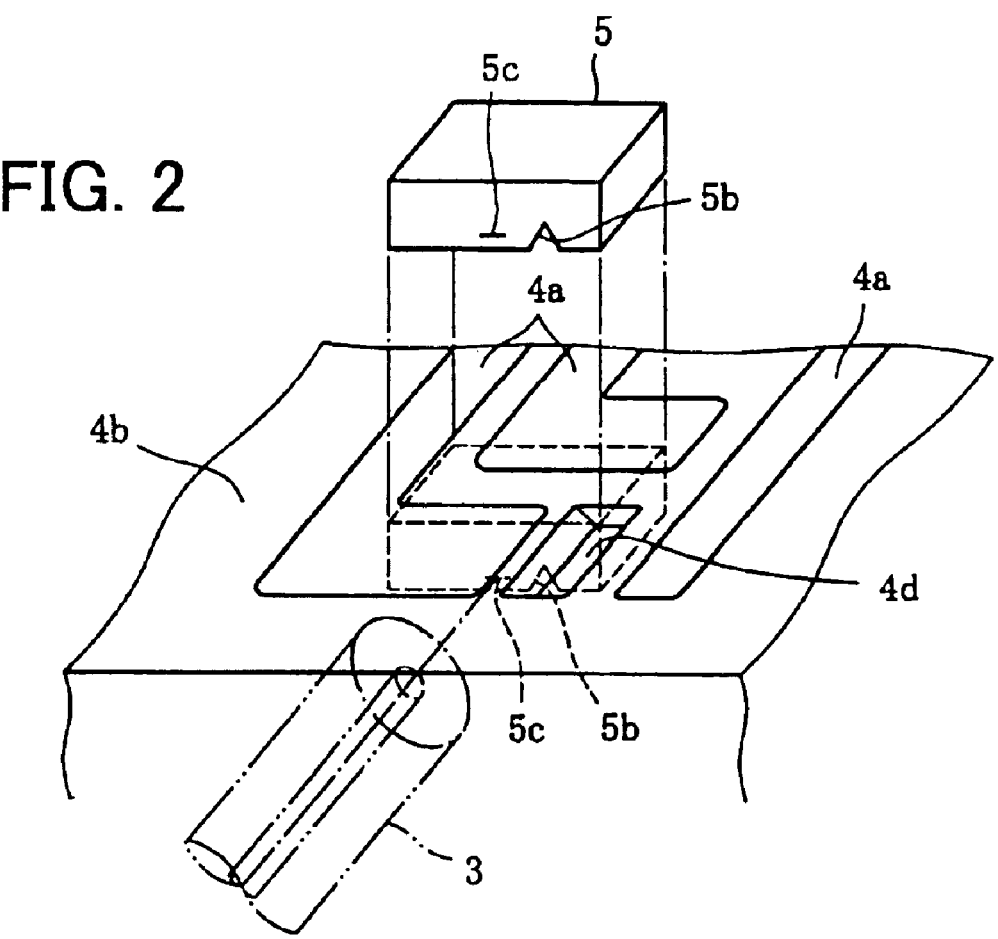
FIG. 2 is a partially exploded view of the optical element mounted body according to the present invention, in the vicinity of the region I in FIG. 1.

FIG. 2 is a partially exploded view of the optical element mounted body according to the present invention, in the vicinity of the region I in FIG. 1. As shown in FIG. 1 and in FIG. 2, on the mounting surface 4b of the mounting substrate 4, a hollow 4d that is to face the V-groove 5b of the LD 5 when the LD 5 is mounted on the mounting substrate 4b is formed. The hollow 4d is capable of receiving the projection 5d of the LD 5, out of contact with the mounting surface 4b. Thus, even in the presence of the projections 5d irregularly generated by an abnormal crystal growth of semiconductor in a manufacturing process of the LD 5, the junction-down mounting of the LD 5 on the mounting surface 4b is not hindered on account of the conflict of the projection 5d against the mounting surface 4b of the mounting substrate 4. In addition, even when the projection 5d is too high, the projection 5d can be received within the hollow 4d untouched. Hence, the LD 5 can be fixed on the mounting surface 4b of the mounting substrate 4 substantially with no gap.

Consequently, it is possible not only to ensure the fixing strength of the LD 5 to the mounting substrate 4, but also to precisely position the active layer 5c of the LD 5 at a predetermined height above the mounting surface 4b as a fiducial plane. In addition, it is possible to ensure an efficient heat dissipation from the LD 5 to the mounting substrate 4, enabling to keep a performance of the LD 5.

The LD 5 is fixed on the mounting substrate 4, after being aligned such that one of the V-grooves 4c on the mounting substrate 4 and the V-groove marker 5b on the LD 5 are positioned relatively with a predetermined separation interposed therebetween in the widthwise direction of the mounting substrate4. In this situation, the active layer 5c of the LD 5 is positioned at a predetermined distance away from the center of the one V-groove 4c of the mounting substrate 4 in the widthwise direction.

In the present invention, since the junction-down mounting of the LD 5 is not hindered by the irregular projection, the active layer 5c of the LD 5 can be precisely positioned relative to the mounting substrate 4, both in height and widthwise direction.

Figure 10:
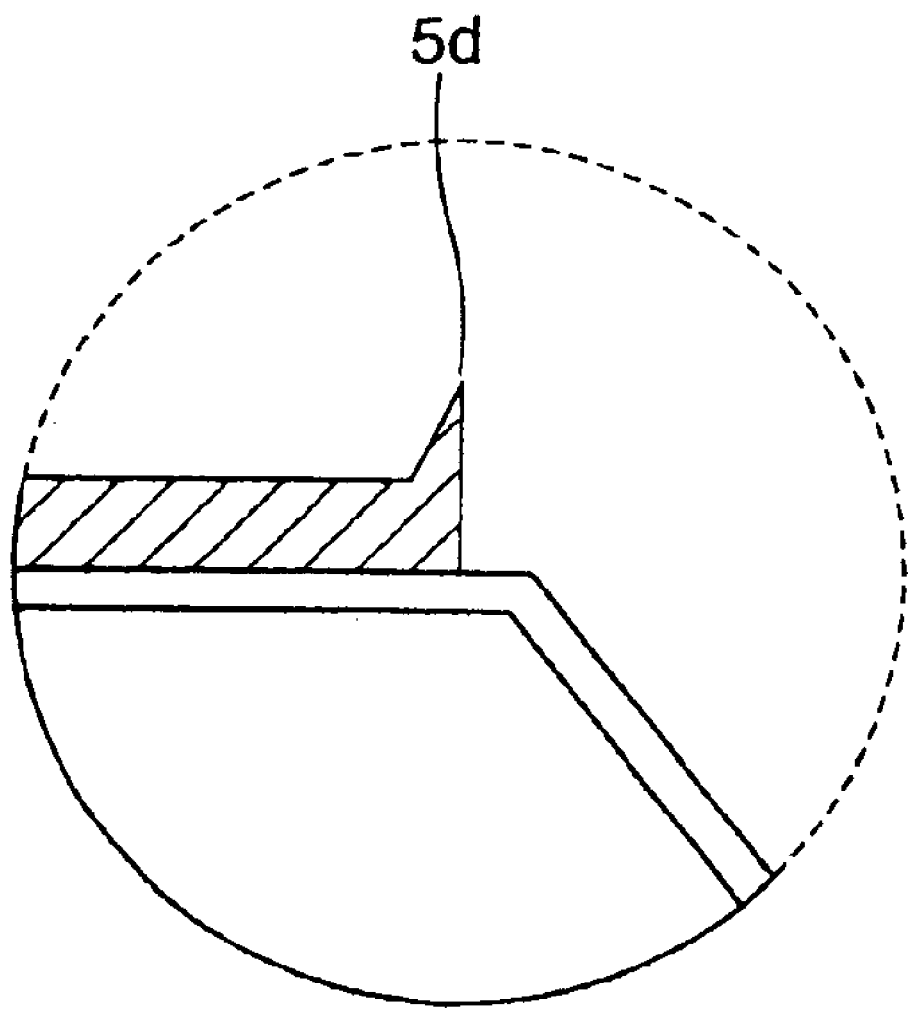
FIG. 10 is an expanded view of the region V in FIG. 7, schematically showing a projection that may be generated on an edge portion of the electrode.

Note that the present invention is applicable not only to the case where a projection 5d generated by an abnormal crystal growth of semiconductor is present in the vicinity of the alignment marker in the form of a V-groove 5b of the semiconductor laser element 5 but also to the case where a projection 5d generated in an electrode forming process is present on an edge portion of the upper electrode 5k, as shown in FIG. 10, in which case the hollow 4d of the mounting substrate 4 is opposed to the projection 5d on the electrode 5k and prevents a gap from occurring between the semiconductor laser element 5 and the mounting surface 4b.

Figure 11A:
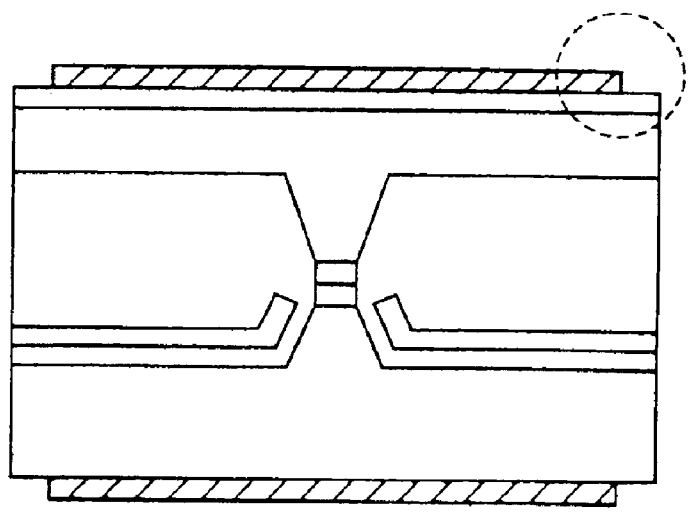
FIG. 11(A) is a sectional view showing another example of the semiconductor laser element.
Figure 11B:
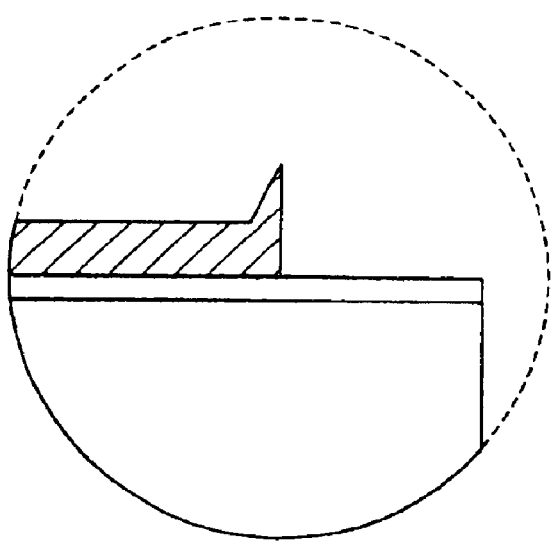
FIG. 11(B) is an expanded view of the region VI in FIG. 11(A), schematically showing a projection that may be generated on an edge portion of the electrode.

Further, in the present invention, the semiconductor laser element is not necessarily formed with an alignment marker in the form of a V-groove 5b, but it may be one with no such V-groove as shown in FIG. 11(A), and may be formed instead with an electrode 5k whose edge on the upper surface (primary surface) is precisely positioned relative to the mesa stripe including an active layer 5c, so that the edge of the electrode 5k can serve as an alignment marker when being mounted on the mounting surface 4b of the mounting substrate 4. As shown in FIG. 11(B), if a projection 5d is generated on an edge portion of the electrode 5k in an electrode forming process of such semiconductor laser element 5', the projection 5d may be a cause of a gap between the semiconductor laser element 5' and the mounting surface 4b of the mounting substrate 4.

The mounting substrate 4 may be fabricated as follows.

First, a thermally oxidized layer is formed on a surface of a Si(100) substrate. The portions on the thermally oxidized layer, excluding those to correspond to the hollow 4d and the V-grooves 4c, are masked with a photoresist material. Then, the unmasked portions of the thermally oxidized layer are removed from the surface by a dry-etching technique such as a reactive ion etching (RIE) using $C_2F_6$ as reactant gas, or by a wet-etching technique using fluoric acid. Thereafter, the silicon substrate is immersed in a potassium hydroxide (KOH) solution, where the unmasked portions of the silicon substrate are etched anisotropically, and thereby a hollow 4d and V-grooves 4c defined by two slanted surfaces constituted by (111) planes of silicon are formed on the surface of the substrate.

As the projection 5d generated by an abnormal crystal growth of semiconductor is typically 5 $\mu$m in spread, 2 $\mu$m in height, with the length thereof not exceeding the longitudinal length of the optical semiconductor element, the hollow 4d to face the V-groove 5b is preferably 10 $\mu$m or more in width, 5 $\mu$m or more in depth, with the length thereof depending on the length of the optical semiconductor element and typically 300 $\mu$m or more.

Then, the photoresist mask is removed from the surface of the silicon substrate by wet-etching, and thereafter, a metal layer is formed on the surface by sputtering. The portions on the metal layer to correspond to a predetermined wiring patterns 4a are masked with photoresist material, and then, the exposed portion of the metal layer is etched off and the remaining masks are removed to form the predetermined wiring patterns 4a. The fabrication of the mounting substrate 4 is thus completed.

As explained above, the mounting substrate may preferably be formed of silicon for its superior machinability, efficient heat dissipation and low cost. The V-grooves 4c and the hollow 4d may be formed by various kinds of technique such as anisotropic etching, isotropic etching or machining. Specifically if silicon is used to make the mounting substrate, they may preferably be formed by anisotropic wet-etching technique using potassium hydroxide solution, for its superior precision-making and reproducibility in dimension and shape, as explained above. Note, however, that the material for the mounting substrate is not limited to silicon but may be silicon oxide or silicon nitride, in which cases the hollow and the V-grooves may be formed by machining or they may be formed in a sintering process of the material to form the mounting substrate.

Next, the optical module of the present invention will be explained with reference to the drawings.

Figure 3:
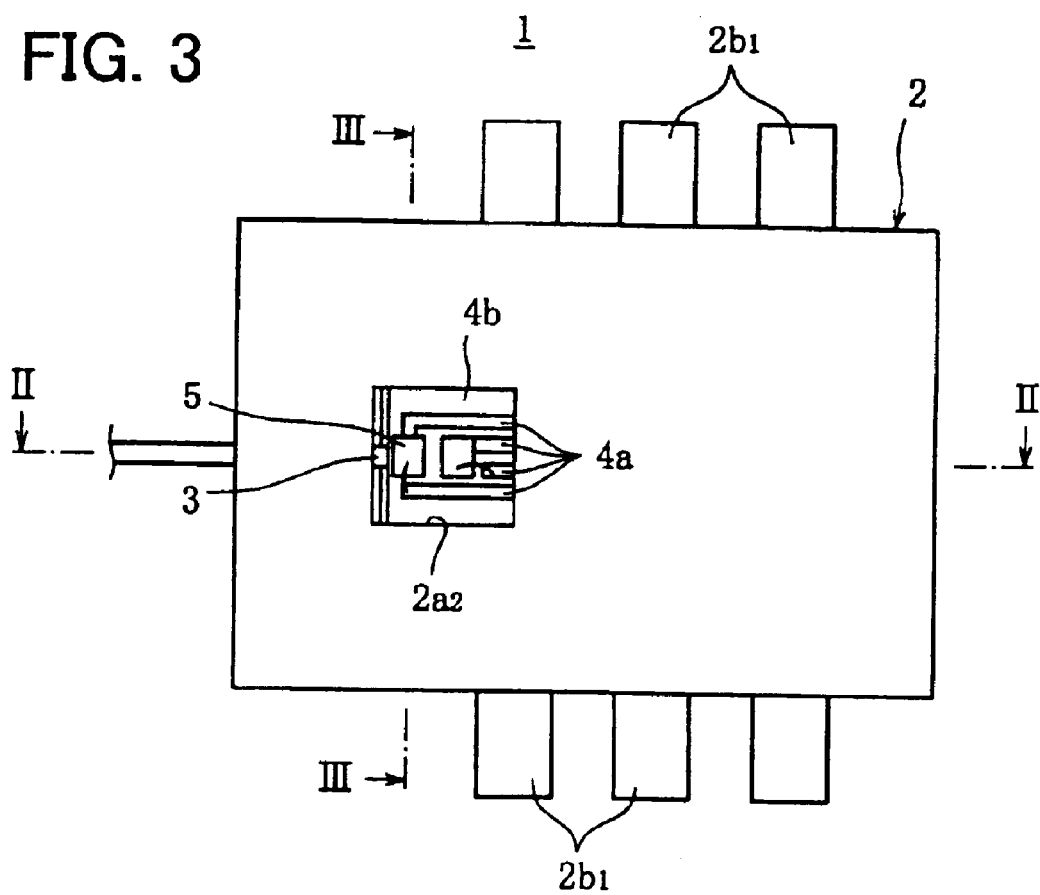
FIG. 3 is a plan view showing an optical module according to the present invention.
Figure 4:
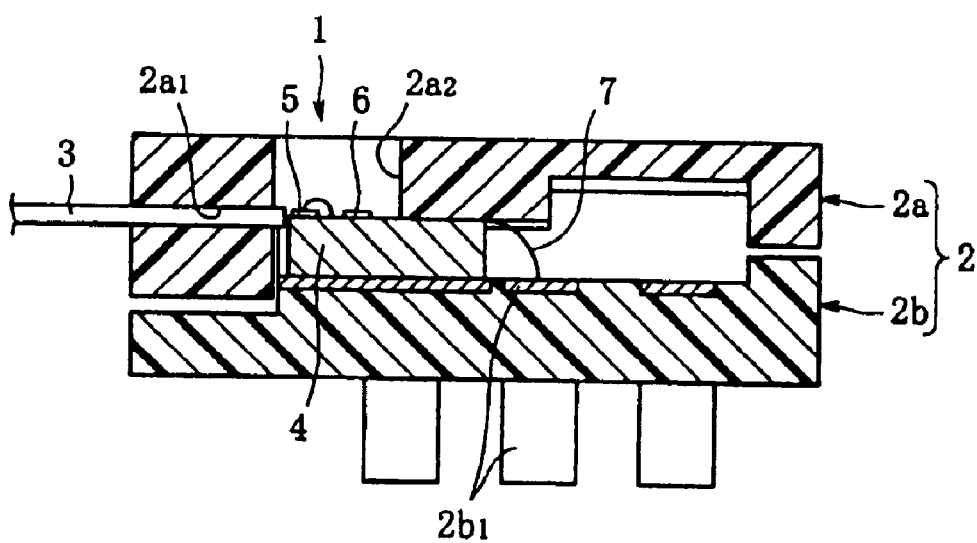
FIG. 4 is a sectional view taken along the line II—II in FIG. 3.

FIG. 3 is a plan view showing an optical module according to one embodiment of the present invention, and FIG. 4 is a sectional view taken along the line II—II in FIG. 3.

The optical module 1 has a resin-made package 2, which is an assembled body of a first package 2a and a second package 2b, as shown in FIG. 4. The first package 2a has a longitudinal hole 2a1 and an aperture 2a2. An optical fiber 3 is introduced through the longitudinal hole 2a1, with an end face of the optical fiber protruding inside the package 2.

Figure 5:
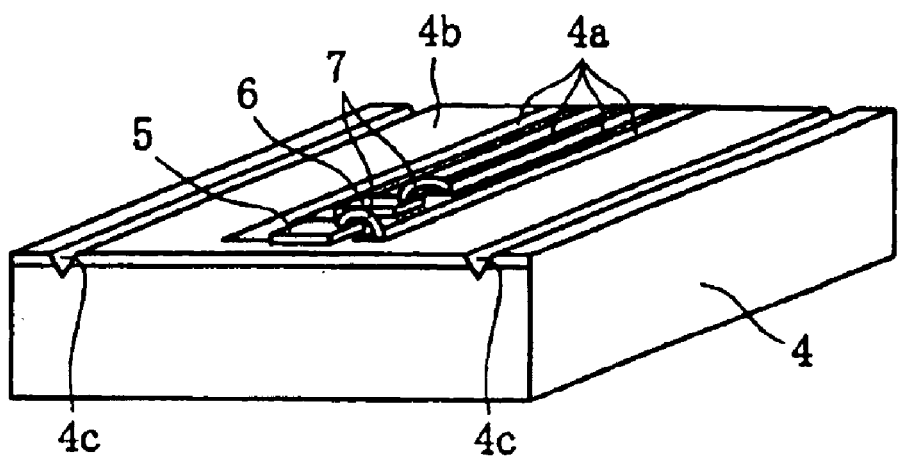
FIG. 5 is a perspective view showing the mounting substrate constituting the optical module of FIG. 3, with an LD and a PD mounted on the mounting substrate.

The mounting substrate 4 is fixed on a bottom surface of the second package 2b. On the wiring patterns 4a on the mounting substrate 4, an LD 5 emitting a laser beam and a PD 6 for monitoring an intensity of the laser beam from the LD 5 are mounted through unillustrated solder layer (see FIG. 5). The LD 5 is mounted junction-down on a mounting surface 4b of the mounting substrate 4. Each upper surface of the LD 5 and PD 6 is electrically connected to the wiring patterns 4a by gold wires 7.

Also, as shown in FIG. 4, the wiring patterns 4a are electrically connected to leads 2b1 of the second package 2b by use of gold wires 7, whereby the lead 2b1 and the LD 5/PD 6 are electrically connected.

Figure 6:
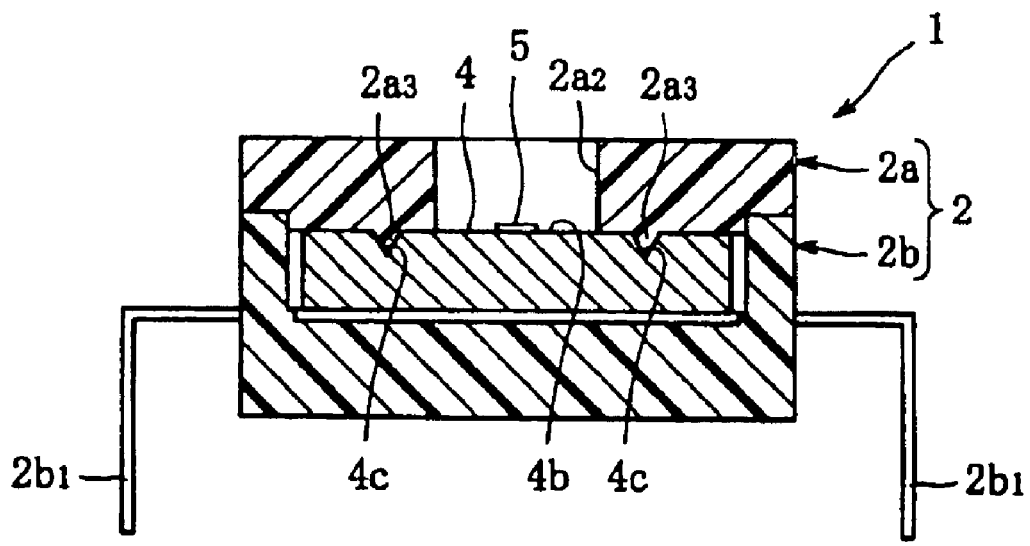
FIG. 6 is a sectional view taken along the line III—III in FIG. 3.

As shown in FIG. 6, the first package 2a has two ridges 2a3 which engage with the two V-grooves 4c of the mounting substrate 4. Since the ridges 2a3 and the longitudinal hole 2a1 for introducing the optical fiber 3 are simultaneously formed in one molding process, their relative position is precisely determined by the precision of the mold with which the first package is formed. Therefore, the optical fiber 3 held by the longitudinal hole 2a1 can be precisely positioned relative to the mounting substrate 4 by simply engaging the ridges 2a3 of the first package 2a1 with the V-grooves 4c of the mounting substrate 4.

In the optical module according to the present invention, since the active layer 5c of the LD 5 is precisely positioned relative to the mounting substrate 4 both in height above the mounting surface 4b and in its widthwise direction, and since the optical fiber 3 is precisely positioned relative to the mounting substrate 4, the relative position between the optical fiber 3 and the active layer of the LD 5 can be precisely determined through the mounting substrate 4. Hence, in the optical module 1, the optical coupling efficiency between the LD 5 and the optical fiber 3 can be sufficient.

The optical module 1 is manufactured as follows.

First, a semiconductor laser element (LD) 5 is soldered on a mounting surface 4b of a mounting substrate 4, in the manner described above. Thus, the relative position between the LD 5 and the mounting substrate 4 are precisely fixed.

Next, the mounting substrate 4 is disposed on the second package 2b, and the wiring patterns 4a and the leads 2b1 are electrically connected by gold wires 7. Thereafter, the first package 2a is placed on the second package 2b, such that the ridges 2a3 on the first package 2a are engaged with corresponding V-grooves 4c on the mounting substrate 4. Thus, the mounting substrate 4 is held between the first package 2a and the second package 2b, as shown in FIG. 4 and FIG. 6. Then, the first package 2a and the second package 2b are fixed together by means of an adhesive agent such as a thermosetting epoxy resin, which has been applied in advance on predetermined portions of the packages.

An optical fiber with a polished end face is inserted into a longitudinal hole 2a1 of the first package 2a1 from the outside thereof, whereupon the optical fiber is caused to abut on a front face of the mounting substrate 4. Thus, the relative position between the optical fiber 3 and the mounting substrate 4 is precisely determined through the first package 2a, and consequently, the relative position between the optical fiber 3 and the active layer 5c of the LD 5 is precisely determined.

Thereafter, the optical fiber 3 is fixed in the longitudinal hole 2a1 using an adhesive such as a thermosetting epoxy. A synthetic resin such as an epoxy stuffed with a silica filler is loaded through the aperture 2a2 for the protection of the LD 5. The synthetic resin is loaded until it is flush with the top surface of the first package 2a1. The optical module 1 thus completed is of so-called a pigtail type, wherein the optical fiber 3 extends out from the first package 2a In the above embodiment of the present invention, the optical module 1 includes two pairs of the ridge 2a3 and the V-groove 4c for positioning the mounting substrate 4 and the first package 2a. However, one pair of them may suffice for positioning the mounting substrate 4 and the first package 2a. Alternatively, the ridges 2a3 may be replaced with V-grooves formed on the first package 2a so as to face the V-grooves 4c on the mounting substrate 4, wherein a pair of the V-groove on the first package 2a and the V-groove 4c on the mounting substrate 4 clamp therebetween a columnar member, for example an optical fiber, which restricts the movement of the mounting substrate 4 with respect to the first package 2a, thereby determining the relative position between the mounting substrate 4 and the first package 2a.

Further, the position of the optical fiber 3 relative to the mounting substrate 4 may be determined by forming another V-groove on the surface 4b of the mounting substrate 4, which receive and fix the optical fiber 3 thereat, as opposed to the longitudinal hole 2a1 for inserting the optical fiber 3 in the above-described optical module 1.

EXAMPLE

1. Manufacture of Mounting Substrate

A thermally-oxidized layer of about 0.8 $\mu$m thick was formed on a surface of a Si(001) substrate. A photoresist layer was spin-coated on the thermally oxidized layer. Thereafter, by exposing and developing the photoresist layer, a mask having apertures of 145 $\mu$m in width and 1500 $\mu$m in length to correspond to two V-grooves 4c and an aperture of 20 $\mu$m in width and 350 $\mu$m in length to correspond to a hollow 4d was formed on the surface. The distance between the centers of the apertures for the two V-grooves 4c was set 1.5 mm, and the distance between the aperture for one of the V-grooves 4c and that for the hollow 4d was set 425 $\mu$m.

Next, the thermally oxidized layer exposed at the apertures of the masks on the silicon substrate was removed by RIE using $C_2F_6$ as a reactant gas. The substrate was then removed of the masks, and was etched at the portions where the thermally oxidized layer had been removed in the previous step in order to form the hollow 4d and the V-grooves 4c. The resultant hollow 4d was 20 $\mu$m in width, 14 $\mu$m in depth, and 350 $\mu$m in length, and the V-grooves 4c were 150 $\mu$m in depth.

Thereafter, a metal layer of 0.8 $\mu$m thick composed of Ti/Pt/Au was formed on the entire top surface of the silicon substrate on which such V-grooves 4c and hollows 4d had been formed. Subsequently, on the metal layer, a mask was formed on the portion to correspond to a predetermined wiring patterns 4a. The exposed metal was then etched off to form the predetermined wiring patterns 4a. The substrate was cut into pieces of 1.5 mm by 3.5 mm. The manufacture of the mounting substrate 4 was thus completed.

2. Manufacture of Package

A first package 2a was formed by molding a composition of resin prepared by blending 100 parts by weight of polyphenylene sulfide (PPS), which is superior in dimensional accuracy for molding, with 100 parts by weight of silica filler. The same composition of resin was used to form a second package 2b, which was integrally molded with leads 2b1 made of 58Fe-42Ni alloy, for example.

3. Fabrication of Optical Module

A semiconductor laser element (LD) 5 as shown in FIG. 7, having a V-groove marker 5b of 300 $\mu$m in length and 10 $\mu$m in width on its crystal-grown primary surface and a Au—Sn solder layer of about 2 $\mu$m thick on its n-electrode 5k, was prepared. The LD 5 was placed at a predetermined position on a mounting surface 4b of the mounting substrate 4, with the primary surface of the LD 5 being faced to the mounting surface 4b. The distance between centers of the V-groove marker 5b of the LD 5 and one of the V-groove 4c of the mounting substrate 4 was set 425 $\mu$m. Then, LD 5 was fixed to the mounting surface 4b by heating the mounting substrate 4 at 320 BC for 30 seconds.

Thereafter, a photodiode (PD) 6 was placed adjacent the LD 5 along the optical axis on a predetermined position on the wiring pattern 4a, whereupon the PD 5 was fixed to the mounting surface 4b in the same manner as the LD 5.

The LD 5 had a lamination structure including a mesa stripe having a InGaAsP active layer 5c and a n-InP clad layer 5f formed sequentially in this order on a p-InP substrate 5e; p-InP buried layer 5g and n-InP buried layer 5h burying the mesa stripe; a n-InP clad layer 5i, n-InGaAsP cap layer 5j and n-electrode 5k formed sequentially in this order on the mesa stripe and the buried layer; and a p-electrode 5l formed on an undersurface of the substrate 5e.

Then, the mounting substrate 4 was disposed on the second package 2b, and electrical wirings are made between the wiring patterns 4a and the p-electrode 5l of the LD 5, between the wiring patterns 4a and the electrode of the PD 6, and between the wiring patterns 4a and the lead 2b1.

Thereafter, the first package 2a was placed on the second package such that ridges 2a3 of the first package 2a are engaged with the V-grooves 4c of the mounting substrate 4, and an optical fiber 3 is inserted in a longitudinal hole 2a1. A thermosetting epoxy adhesive agent was applied on a predetermined portion of the packages, and then the entire packages were heated, whereby the first package 2a and the second package 2b were fixed together, and the optical fiber 3 and the longitudinal hole 2a1 of the first package 2a were fixed together.

Finally, the LD 5 and PD 6 were sealed with an epoxy resin blended with a silica filler. The epoxy resin was loaded from an aperture 2a2 of the first package 2a.

Advantages derived from the present invention may include one or more of the following.

According to one or more embodiment of the present invention, the mounting substrate has a hollow that faces a predetermined structure, such as a V-groove or an edge portion of an electrode, on a primary surface of the optical semiconductor element. Because of this, the optical semiconductor element can be fixed junction-down on a mounting surface of the mounting substrate substantially with no gap even in the presence of a projection irregularly generated on or in the vicinity of the predetermined structure in a manufacturing process of the optical semiconductor element.

Therefore, according to one or more aspect of the present invention, the thermal impedance between the optical semiconductor element and the mounting substrate is avoided to be excessively large, whereby the performance of the optical semiconductor element can be maintained.

According to one or more aspect of the present invention, the irregular projection on or in the vicinity of the predetermined structure on the primary surface of the optical semiconductor element is prevented from affecting deleteriously to the aligned position of an active layer (or an light-emitting or light-receiving portion) of the optical semiconductor element relative to the mounting substrate. Because of this, the position of the light-emitting/light-receiving portion relative to the mounting substrate can be realized as designed, making it possible to prevent the coupling efficiency between the optical semiconductor element and an optical fiber from being reduced or changed by a misalignment caused by the irregular projection.

According to one or more aspect of the present invention, the fixing strength of the optical semiconductor element to the mounting substrate is ensured. Because of this, it is possible to avoid the optical semiconductor element coming off the mounting substrate when being wire-bonded to an external circuit.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. An optical element mounted body comprising:
   an optical semiconductor element having a light-emitting/light-receiving portion and a projection in the vicinity of an edge and/or along a V-groove marker on a primary surface thereof; and
   a substrate having a mounting surface formed with a first hollow;
   wherein said optical semiconductor element is mounted junction-down on said substrate such that said projection of said optical semiconductor element and said first hollow of said substrate are positioned to oppose one another.

2. The optical element mounted body according to claim 1, wherein said V-groove marker is formed with a predetermined positional relation to said light-emitting/light-receiving portion.

3. The optical element mounted body according to claim 2, wherein said V-groove marker is used as an alignment marker when aligning said light-emitting/light-receiving portion on said substrate.

4. The optical element mounted body according to claim 1, wherein said first hollow receives said projection.

5. The optical element mounted body according to claim 1, further comprising:
   a second hollow extending in parallel to a light-emitting/light-receiving direction of said light-emitting/light-receiving portion which is used as an alignment marker when aligning said substrate to a package.

6. The optical element mounted body according to claim 5, wherein said second hollow is a V-groove.

7. The optical element mounted body according to claim 5, wherein said first hollow extends in parallel to a light-emitting/light-receiving direction of said light-emitting/light-receiving portion.

8. The optical element mounted body according to claim 1, wherein said substrate is made of silicon.

9. The optical element mounted body according to claim 8, wherein said first hollow includes etched walls.

10. The optical element mounted body according to claim 8, wherein said first hollow is not less than 10 $\mu$m in width, and not less than 5 $\mu$m in depth.

11. The optical element mounted body according to claim 1, wherein said projection is composed of a semiconductor.

12. The optical element mounted body according to claim 11, wherein said projection is comprised of crystal growth.

13. An optical module comprising:
   an optical semiconductor element having a light-emitting/light-receiving portion and a projection generated in the vicinity of an edge and/or along a V-groove marker on a primary surface thereof;
   a substrate having a mounting surface;
   an optical component optically coupled to said optical semiconductor element; and
   a package housing said optical semiconductor element and said substrate;
   wherein said substrate has a first hollow formed on said mounting surface, and
   wherein said optical semiconductor element is mounted junction-down on said substrate such that said projection of said optical semiconductor element and said first hollow of said substrate are positioned to oppose one another.

14. The optical module according to claim 13, wherein said projection has a predetermined positional relation to said light-emitting/light-receiving portion.

15. The optical module according to claim 13, wherein said first hollow receives said projection.

16. The optical module according to claim 13, wherein said substrate is made of silicon.

* * * * *